US008400117B2

(12) United States Patent
Fourmy et al.

(10) Patent No.: US 8,400,117 B2
(45) Date of Patent: Mar. 19, 2013

(54) METHOD FOR CONTROLLING THE PROGRESSIVE CHARGE OF A MOTOR VEHICLE ALTERNATOR

(75) Inventors: Stéphane Fourmy, Vitry sur Seine (FR); Sokha Ly, Paris (FR); Philippe Hazard, Creteil (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 582 days.

(21) Appl. No.: 12/752,307

(22) Filed: Apr. 1, 2010

(65) Prior Publication Data

US 2010/0264884 A1 Oct. 21, 2010

(30) Foreign Application Priority Data

Apr. 17, 2009 (FR) ...................................... 09 52511

(51) Int. Cl.
*H02P 9/00* (2006.01)
*H02J 7/16* (2006.01)
(52) U.S. Cl. .......................................... 322/23; 322/28
(58) Field of Classification Search .................... 322/22, 322/23, 28, 29, 37, 44, 59
See application file for complete search history.

(56) References Cited

U.S. PATENT DOCUMENTS

| 5,561,363 | A | * | 10/1996 | Mashino et al. | 322/25 |
|---|---|---|---|---|---|
| 5,637,985 | A | * | 6/1997 | Kakizaki et al. | 322/28 |
| 5,703,410 | A | * | 12/1997 | Maekawa | 290/40 C |
| 5,773,964 | A | * | 6/1998 | Peter | 322/20 |
| 5,886,504 | A | * | 3/1999 | Scott et al. | 322/15 |
| 6,894,402 | B2 | * | 5/2005 | Dubus et al. | 290/40 C |
| 6,900,618 | B2 | * | 5/2005 | Maehara | 322/28 |
| 7,170,263 | B2 | * | 1/2007 | Yamamoto et al. | 322/59 |
| 7,514,807 | B2 | * | 4/2009 | Donnelly et al. | 290/40 C |
| 7,528,585 | B2 | * | 5/2009 | Maehara | 322/59 |
| 8,138,730 | B2 | * | 3/2012 | Tsuzuki | 322/44 |
| 8,334,678 | B2 | * | 12/2012 | Aoyama | 322/28 |
| 2003/0178973 | A1 | | 9/2003 | Maehara | |
| 2007/0085511 | A1 | | 4/2007 | Uematsu et al. | |
| 2007/0085512 | A1 | | 4/2007 | Maehara | |
| 2008/0191482 | A1 | | 8/2008 | Okuno | |

\* cited by examiner

*Primary Examiner* — Nicholas Ponomarenko
(74) *Attorney, Agent, or Firm* — Berenato & White, LLC

(57) ABSTRACT

A method for controlling the progressive charge of a motor vehicle alternator. The alternator comprises a stator, a rotor which is provided with an excitation coil, a voltage regulator which acts on an excitation current which is supplied to the excitation coil in order to regulate an output voltage of the alternator, and a device for controlling the progressive charge which, by means of limitation of the excitation current to a maximum value, determines a maximum mechanical torque which the alternator can collect on a thermal engine of the vehicle. The maximum mechanical torque is determined according to a speed of rotation ($N_{ALT}$) of the alternator, and the progressive charge control device comprises a so-called progressive charge return (PCR) signal which indicates the maximum value which the excitation current (Iexc) can assume. When the excitation current assumes a stabilized value (G), the progressive charge return (PCR) signal is updated (H) so as to indicate a maximum current value of the excitation current which is equal to the stabilized value.

6 Claims, 5 Drawing Sheets

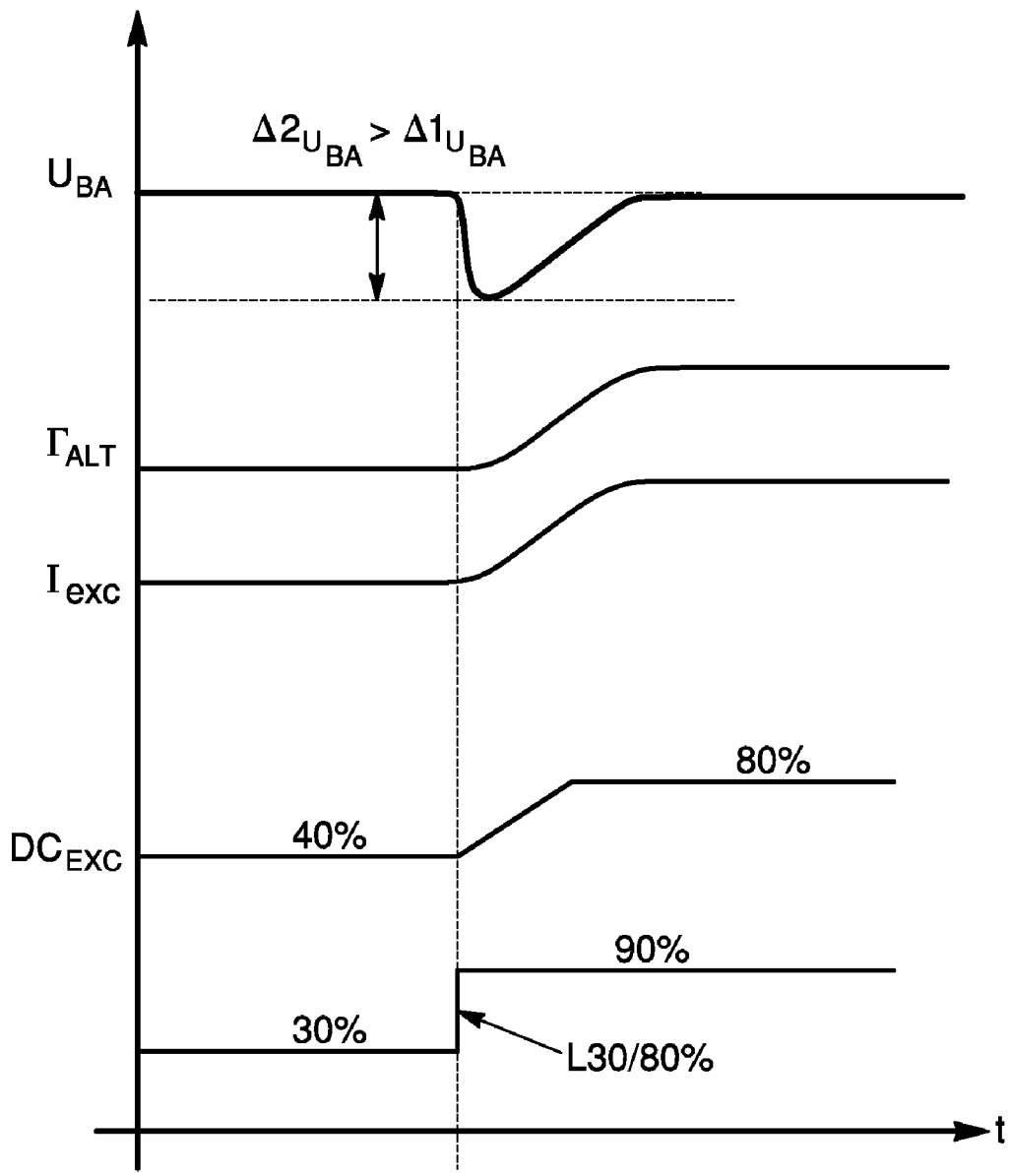

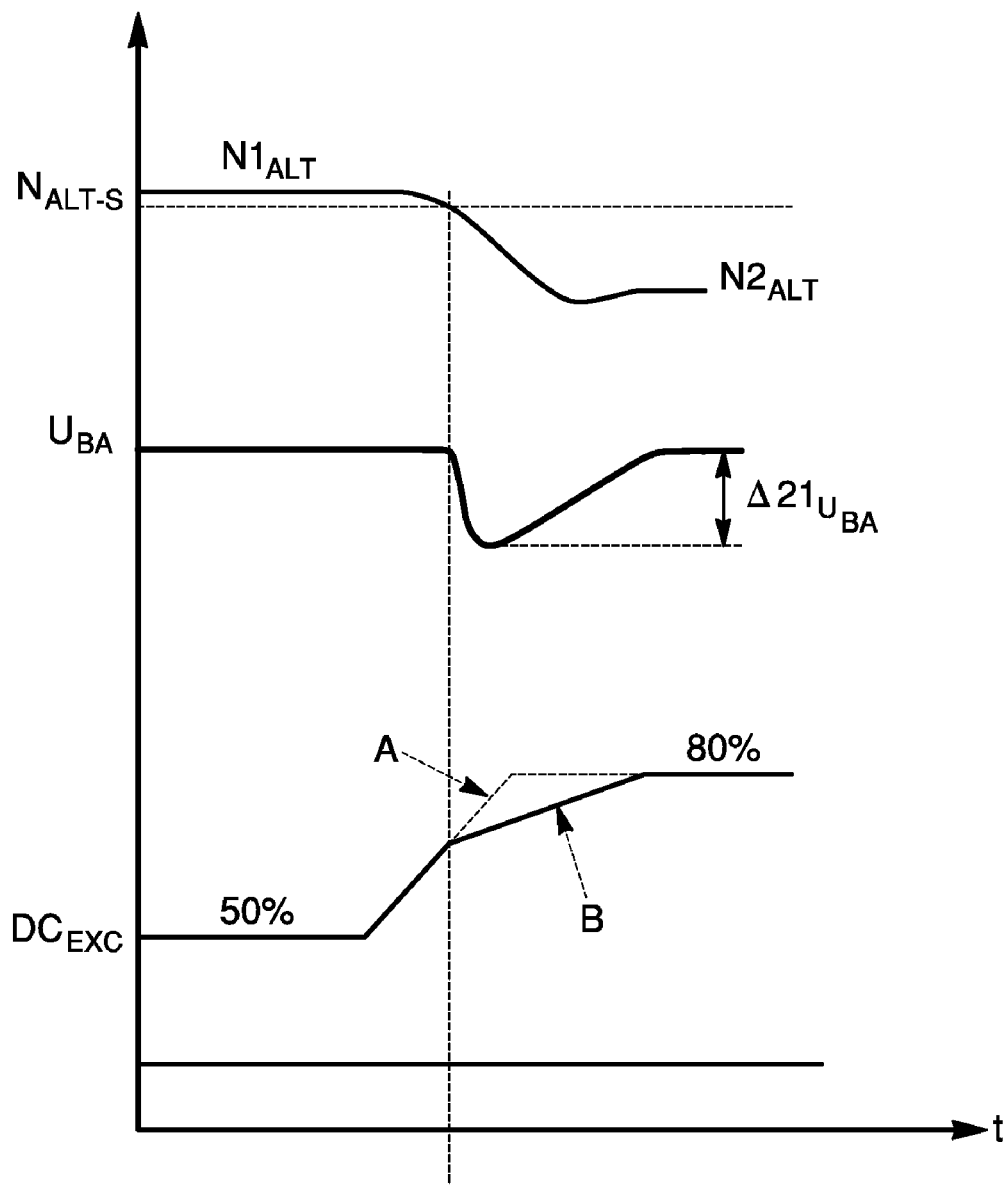

METHOD FOR CONTROLLING THE PROGRESSIVE CHARGE OF A MOTOR VEHICLE ALTERNATOR

This application is a US Utility Patent Application, and claims priority to French patent application Ser. No. 09/52511 filed Apr. 17, 2009.

BACKGROUND OF THE INVENTION a) Field of the Invention

The invention relates to a method for controlling the progressive charge of a motor vehicle alternator, which is designed to produce an electrical supply voltage for the on-board network of the latter, in response to an excitation current which is applied to the alternator.

b) Description of the Prior Art

Methods for controlling the progressive charge of a motor vehicle alternator are already known.

The progressive charge function in an alternator makes it possible in particular to avoid stalling the thermal engine when the latter is functioning at low speed, particularly when idling, and substantial electric charges are activated in the vehicle.

The progressive charge function prevents stalling of the thermal engine by avoiding a rapid increase in the torque which is collected on the thermal engine by the alternator if a substantial electric charge is triggered. For this purpose, significant variations of the excitation current applied to the alternator rotor are limited by the progressive charge function.

For example, taking into consideration a variation of electric charge of 50 Amps with 15 Volts, i.e. 750 Watts, with an alternator output of 50%, the variation of mechanical power which is collected on the engine is 1500 Watts, and represents approximately 13% of the power supplied at idling speed by a thermal engine with average power. In certain cases, a variation of charge of this type can give rise to stalling of the thermal engine.

FIGS. 1A and 1B show the advantages and disadvantages provided by the progressive charge function in control of the alternator. These figures correspond to a situation in which the alternator functions at a constant speed, in an alternator speed range in which the progressive charge function is activated, i.e. a speed of between $N_{ALT}=0$ rpm at $N_{ALT}=N_{ALT-S}$. Beyond the speed $N_{ALT-S}$, for example $N_{ALT-S}=3000$ rpm (i.e. an engine speed of approximately 1000 rpm), the progressive charge function is inhibited, since the thermal engine then has sufficient power to eliminate any risk of stalling.

FIG. 1A shows the effects on the torque $\Gamma_{ALT}$ collected by the alternator on the thermal engine, and on the regulated voltage $U_{BA}$ supplied by the alternator, for example during a variation of electric charge L30/90 on an alternator, i.e. from 30% to 90% of the nominal power of the alternator, in an alternator which is not equipped with the progressive charge function.

As shown in FIG. 1A, when the variation of charge L30/90 takes place, a loop for regulation of the voltage $U_{BA}$ which is provided in the alternator gives rise to a strong increase in the cyclical ratio $DC_{EXC}$ of an excitation current Iexc of the PWM (Pulse Width Modulation) type, which supplies an excitation coil of the alternator rotor.

In the example in FIG. 1A, this cyclical ratio goes from 40 to 80%, passing via a peak of 100%, and the continuous mean value (shown in FIG. 1A) of the excitation current Iexc is subjected to a sudden variation which affects the torque $\Gamma_{ALT}$ which is collected by the alternator on the thermal engine. A sudden variation of this type can give rise to stalling of the thermal engine.

On the other hand, in its progressive charge function, the regulation loop functions fully in order to maintain the voltage $U_{BA}$ at its set value. This results in low variation $\Delta 1_{UBA}$ of the voltage $U_{BA}$ as a result of the strong variation allowed for the excitation current Iexc and consecutively for the torque $\Gamma_{ALT}$ collected.

FIG. 1B shows the effects on the torque $\Gamma_{ALT}$ collected by the alternator on the thermal engine and on the regulated voltage $U_{BA}$ supplied by the alternator, for example during variation of electric charge L30/90 on an alternator, i.e. from 30% to 90% of the nominal power of the alternator, in an alternator which is equipped with the progressive charge function.

As shown in FIG. 1B, when the variation of electric charge L30/90 occurs, the variation of the cyclical ratio $DC_{EXC}$ of 40 to 80% takes place "gradually", as a result of the action of the progressive charge function. Consequently, the excitation current Iexc and the torque $\Gamma_{ALT}$ vary progressively, and the thermal engine is not acted upon suddenly, thus minimising the risk of stalling of the thermal engine.

On the other hand, with the progressive charge function, as a result of the limitation of the variation of the cyclical ratio $DC_{EXC}$, the voltage regulation loop $U_{BA}$ is "curbed", and substantial variation $\Delta 2_{UBA}$ of the voltage $U_{BA}$ occurs during the variation of the charge L30/90.

This substantial variation of the voltage $U_{BA}$ is one of the known disadvantages of the progressive charge function, and can give rise to certain problems, in particular in situations of periodic variations of the alternator charge.

For example, a situation of periodic variation of the alternator charge takes place when the emergency lights of the vehicle are activated. These period variations of the alternator charge introduce a periodic variation of the voltage $U_{BA}$, and consecutively, for example, visual disturbance in the light beams of the lighting headlights of the vehicle when these are activated.

Particular arrangements are known in the prior art for control of the progressive charge function, in situations of periodic switching of the alternator charge.

In general, these solutions according to the known art use an intermediate signal known as PCR (Progressive Charge Return), which defines a maximum authorised value of the cyclical ratio $DC_{EXC}$. During increasing charge switching, the value of the cyclical ratio $DC_{EXC}$ is updated to the value of the PCR signal. The development of the progressive charge return signal PCR is generated over a period of time by the progressive charge function. This control permits certain jumps in the cyclical ratio $DC_{EXC}$ for increasing charge switchings which take place after a first increasing charge switch, such as to limit subsequent variations of voltage which take place after the first variation of voltage $\Delta 1_{UBA}$.

FIGS. 2A and 2B show functioning of the progressive charge in a situation in which the speed $N_{ALT}$ of the alternator drops, and goes from a speed $N1_{ALT}$ for which the progressive charge function is not active, to a speed $N2_{ALT}$ which is lower than the speed $N_{ALT-S}$, and for which the progressive charge function is triggered, and limits the cyclical ratio $DC_{EXC}$. A situation of this type occurs for example when the vehicle slows down when a braking operation takes place.

As shown in FIG. 2A, the increase in the cyclical ratio $DC_{EXC}$ commanded by the regulation loop, consecutively to the drop in speed and the drop in the correlative voltage, is limited according to the curve portion B by the progressive charge function, which leads to a significant drop $\Delta 2_{UBA}$ in the voltage $U_{BA}$. Without the action of the progressive charge function, the increase in the cyclical ratio $DC_{EXC}$ commanded by the regulation loop would have developed according to the portion of curve A, and would have led to a substantially smaller drop in the voltage $U_{BA}$.

FIG. 2B shows the behaviour of the alternator when the progressive charge function comprises the use of an intermediate PCR signal which defines a maximum permitted value of the cyclical ratio $DC_{EXC}$.

As shown in FIG. 2B, in a situation of this type, for as long as the speed of rotation $N_{ALT}=N1_{ALT}$ is greater than the threshold speed $N_{ALT-S}$, the cyclical ratio $DC_{EXC}$ authorised by the intermediate PCR signal is at its maximum value, i.e. 100%.

When the speed $N_{ALT}$ drops below the threshold $N_{ALT-S}$, a linear decrease (portion indicated as C) of the intermediate PCR signal, according to a gradient which is predetermined by the progressive charge function, is commanded such as to impose an upper limit on the development of the cyclical ratio $DC_{EXC}$. In the known solutions, this decrease in the PCR signal continues until the effective value of the cyclical ratio $DC_{EXC}$ is stabilised. Thus, when an additional charge demand occurs after this stabilisation, no jump in the cyclical ratio $DC_{EXC}$ should be authorised, since the maximum value of the cyclical ratio $DC_{EXC}$ provided by the PCR signal is equal to the present value of the cyclical ratio $DC_{EXC}$. The cyclical ratio $DC_{EXC}$ can then increase only according to a determined progressive charge gradient which is imposed by the PCR signal, in order to avoid a sudden increase in the torque $\Gamma_{ALT}$.

FIG. 2B shows a possible situation with solutions according to the prior art, according to which an increase D in the electrical charge takes place after stabilisation (at 70% in this example) of the cyclical ratio $DC_{EXC}$ whereas the value (85% in this example) of the PCR signal has not yet reached the stabilised value (70%) of the cyclical ratio $DC_{EXC}$. In such a case, the progressive charge function authorises a jump E in the cyclical ratio $DC_{EXC}$, taking into account the fact that the intermediate PCR signal has a value (85% in this example) which is greater than the stabilised value (70%) of the cyclical ratio $DC_{EXC}$, at the instant when the increase D in the electrical charge takes place. In this example, the value of the cyclical ratio $DC_{EXC}$ goes from 70% to 80% and is then stabilised at that value.

In this situation, as shown in FIG. 2B, the torque $\Gamma_{ALT}$ undergoes a sudden increase F which can give rise to stalling of the thermal engine, whereas the progressive charge function is active.

More generally, the above-described situation of a sudden increase F could also occur in cases of variations of the engine speed which take place within the alternator speed range in which the progressive charge function is activated, without requiring a return of the speed $N_{ALT}$ into the range of activation of the progressive charge, as in the preceding example.

It therefore appears necessary to propose an improvement in the progressive charge function in an alternator, such as to avoid possible stalling of the thermal engine, in the situation in which an increase in the electrical charge occurs whilst the progressive charge intermediate return signal has not yet reached a stabilised value of the cyclical ratio of the alternator excitation current.

SUMMARY OF THE INVENTION

According to a first aspect, the present invention provides a method for controlling the progressive charge of a motor vehicle alternator, the alternator comprising a stator, a rotor which is provided with an excitation coil, voltage regulation means which act on an excitation current which is supplied to the excitation coil in order to regulate an output voltage of the alternator, and means for controlling the progressive charge which, by means of limitation of the excitation current to a maximum value, determine a maximum mechanical torque which the alternator can collect on a thermal engine of the motor vehicle, the maximum mechanical torque being determined according to a speed of rotation of the alternator, the progressive charge control means comprising a so-called progressive charge return signal which indicates the maximum value which the excitation current can assume. According to the invention, when the excitation current assumes a stabilised value, the progressive charge return signal is updated so as to indicate a maximum current value of the excitation current which is equal to the said stabilised value.

According to a particular embodiment of the method according to the invention, the excitation current is a signal of the variable pulse width type, and the progressive charge return signal indicates the maximum current value by means of a maximum cyclical ratio of the excitation current.

According to another characteristic, the progressive charge return signal is updated such as to indicate a maximum cyclical ratio of the said excitation current which is equal to a stabilised cyclical ratio corresponding to the said stabilised value.

According to another characteristic, the progressive charge return signal indicates a maximum current value which decreases when the speed of rotation of the alternator decreases, and enters a rotation speed range in which the progressive charge control means are activated.

According to another characteristic, the progressive charge return signal indicates a maximum current value which increases when the alternator is subjected to an increase in electrical charge and the speed of rotation of the alternator is in a rotation speed range in which the progressive charge control means are activated.

According to a second aspect, the present invention provides an alternator for a motor vehicle comprising a stator, a rotor which is provided with an excitation coil, voltage regulation means which act on an excitation current which is supplied to the excitation coil in order to regulate an output voltage of the said alternator, and means for controlling the progressive charge. According to the invention, the progressive charge control means comprise means which can implement the method previously described briefly.

Other advantages and characteristics of the present invention will become more apparent from reading the following description of an embodiment of the present invention, provided with reference to the attached drawings, in which:

BRIEF DESCRIPTION OF THE DRAWINGS

FIGS. 1A and 1B are curves showing an example of functioning of the progressive charge according to the prior art when an increase in the electrical charge intervenes during running at a stabilised low speed;

FIGS. 2A and 2B are curves showing an example of functioning of the progressive charge according to the prior art, when an increase in the electric charge occurs during a return during running at low speed which gives rise to triggering of the progressive charge function, after running at a higher speed at which the function was not triggered.

DETAILED DESCRIPTION OF THE DRAWINGS

Figure 1A:
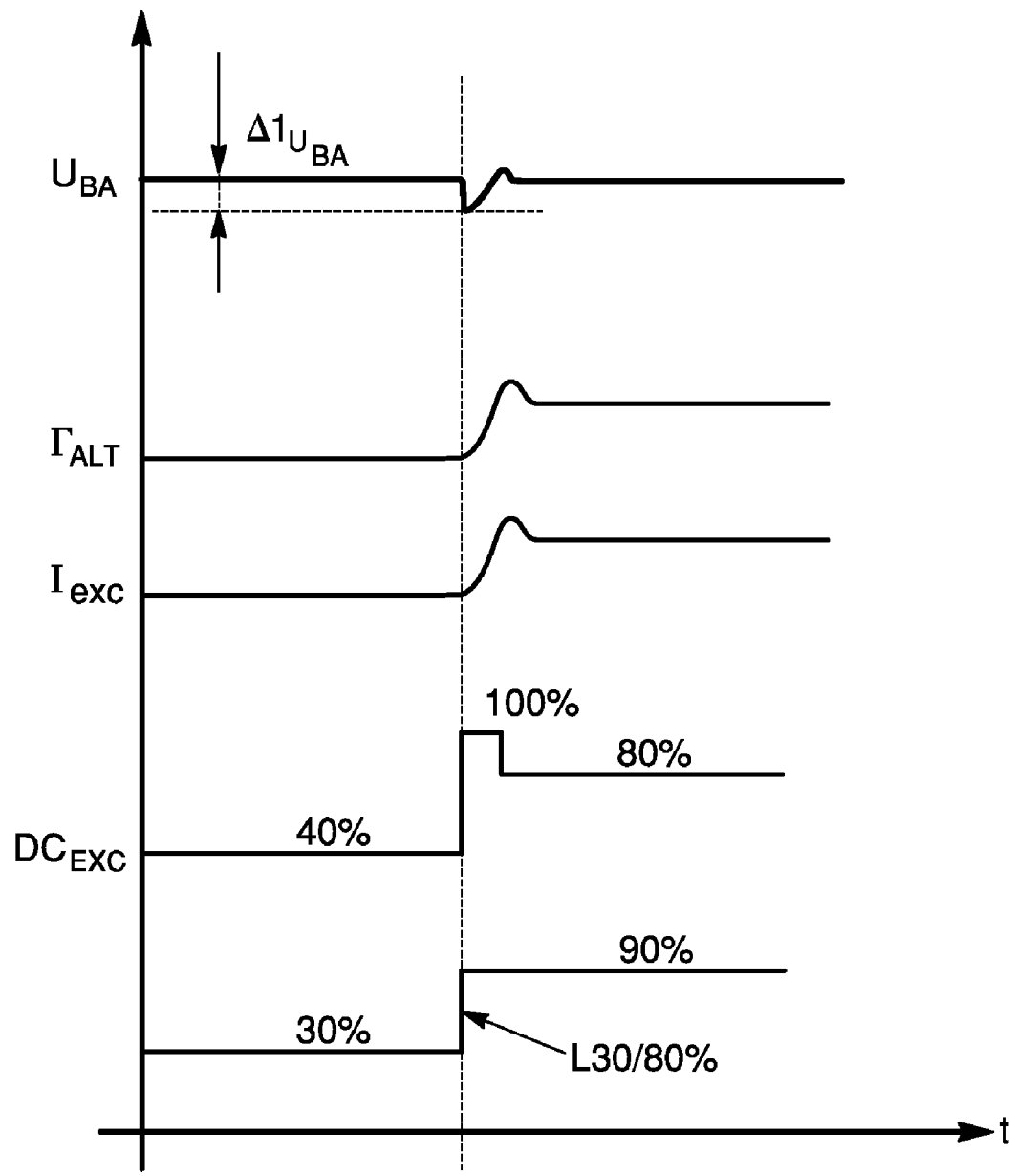
Figure 2B:
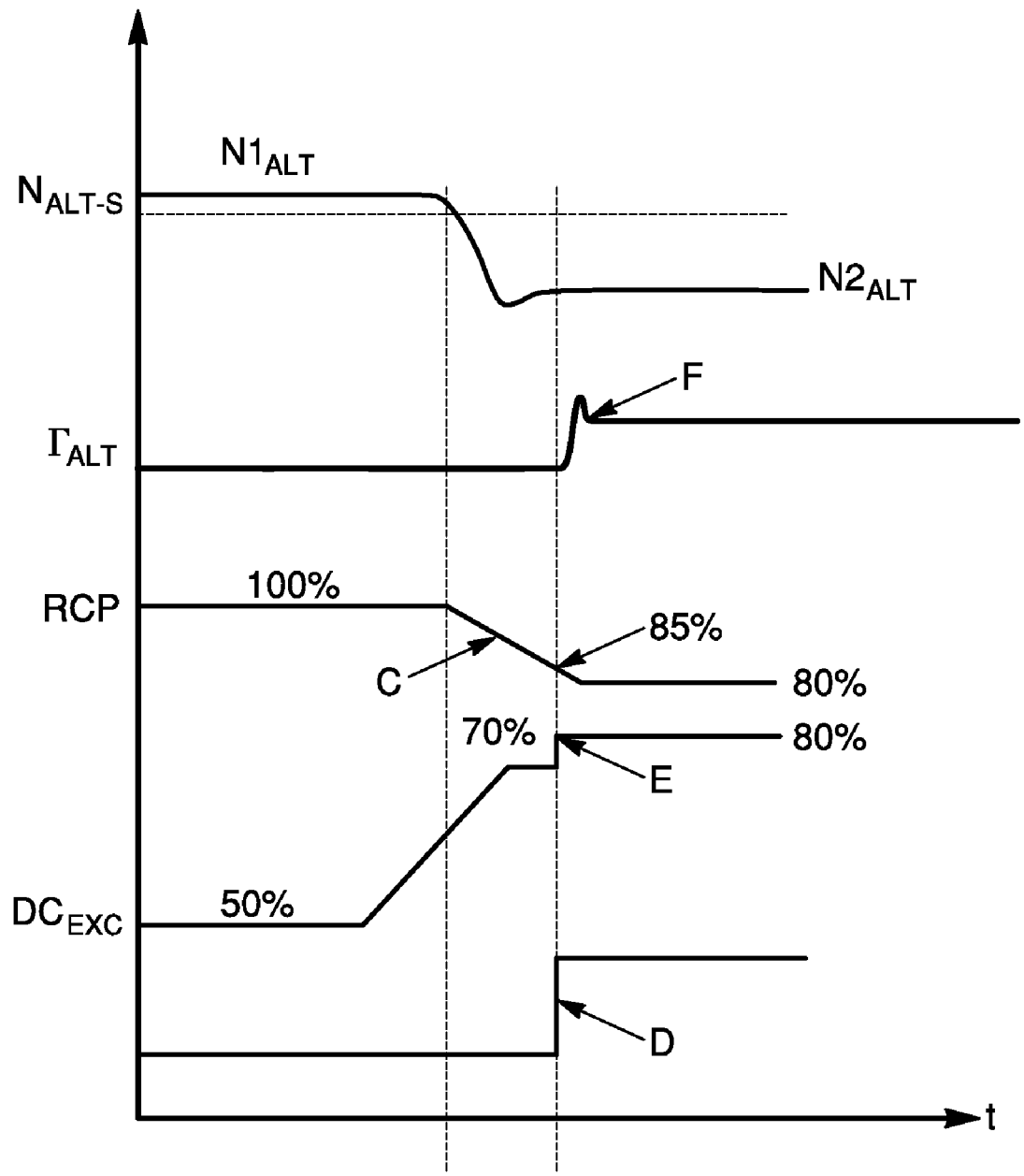
Figure 3:
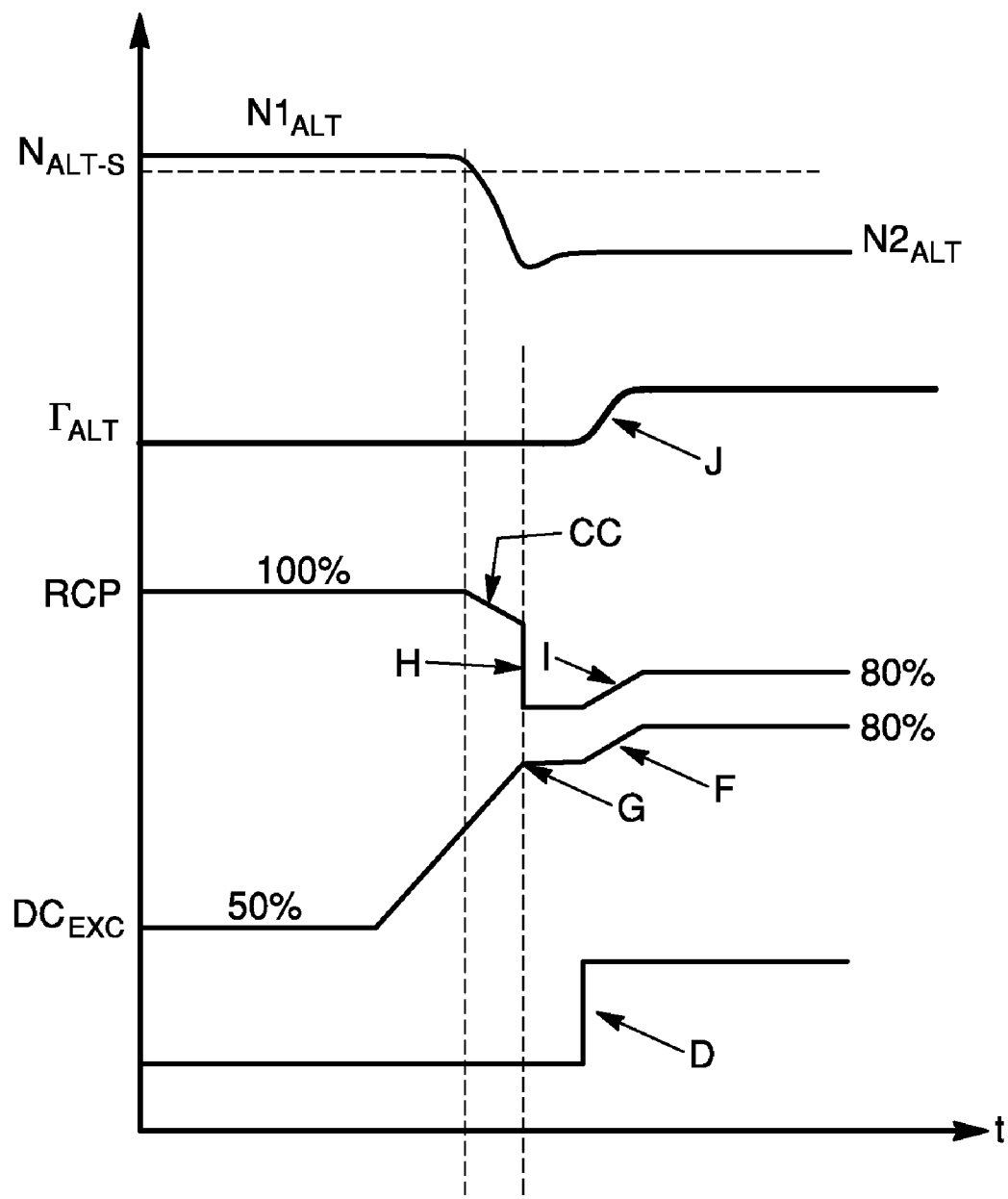
FIG. 3 shows curves for an example of functioning of the progressive charge according to an embodiment of the method according to the invention.

With reference to FIG. 3, the functioning of the progressive charge is now described in the situation of FIG. 2B previously described, but with implementation of the method according to the invention.

In FIG. 3, the intermediate PCR signal, which is initially at the value of 100%, comprises a portion CC which decreases according to a predetermined gradient. This decreasing portion CC, like the portion C in FIG. 2B, is consecutive to a decrease in the speed $N_{ALT}$.

Parallel to the decrease in the speed $N_{ALT}$ and the decrease CC in the intermediate PCR signal, the cyclical ratio $DC_{EXC}$ increases consecutively to the action of the voltage regulation loop, such as to compensate for the effect of the decrease in speed on the output voltage of the alternator.

As shown in FIG. 3, the cyclical ratio $DC_{EXC}$ stabilises at the end of the increase phase to a value of 70% (portion G).

In accordance with the method according to the invention, when the value of the cyclical ratio $DC_{EXC}$ is stabilised, updating takes place (portion H) of the value of the intermediate PCR signal, to the stabilised value of the cyclical ratio $DC_{EXC}$. In this example, the intermediate PCR signal is thus updated to the value of 70%.

According to the invention, updating of this type of the value of the intermediate PCR signal to the stabilised value of the cyclical ratio $DC_{EXC}$ takes place generally when the speed of the alternator $N^{ALT}$ is in the functioning range of the progressive charge.

As shown in FIG. 3, when the increase D in the electric charge occurs, the intermediate PCR signal increases according to a predetermined progressive charge gradient (portion I) and authorises a corresponding progressive increase (portion I') in the cyclical ratio $DC_{EXC}$ (from 70% to 80% in the example in FIG. 3). A progressive charge is thus imposed according to a predetermined gradient, and the torque $\Gamma_{ALT}$ is not subjected to any sudden increase (portion J of $\Gamma_{ALT}$), thus preventing a risk of stalling of the thermal engine.

The invention claimed is:

1. A method for controlling the progressive charge of a motor vehicle alternator, the alternator comprising a stator, a rotor which is provided with an excitation coil, voltage regulation means which act on an excitation current which is supplied to the excitation coil in order to regulate an output voltage of the alternator, and means for controlling the progressive charge which, by means of limitation of the excitation current to a maximum value, determine a maximum mechanical torque which the alternator can collect on a thermal engine of the motor vehicle, the maximum mechanical torque being determined according to a speed of rotation ($N_{ALT}$) of the alternator, the progressive charge control means comprising a so-called progressive charge return (PCR) signal which indicates the maximum value which the excitation current (Iexc) can assume, characterized in that, when the excitation current assumes a stabilised value (G), the progressive charge return (PCR) signal is updated (H) so as to indicate a maximum current value of the excitation current which is equal to the stabilized value.

2. A method according to claim 1, characterized in that the excitation current is a signal of the variable pulse width type, and the progressive charge return signal indicates the maximum current value by means of a maximum cyclical ratio of the excitation current.

3. A method according to claim 2, characterized in that the progressive charge return signal is updated such as to indicate a maximum cyclical ratio of the excitation current which is equal to a stabilized cyclical ratio corresponding to the stabilized value.

4. A method according to claim 1, characterized in that the progressive charge return signal indicates a maximum current value (CC) which decreases when the speed of rotation of the alternator decreases, and enters a rotation speed range in which the progressive charge control means are activated.

5. A method according to claim 1, characterized in that the progressive charge return signal indicates a maximum current value (I) which increases when the alternator is subjected to an increase in electrical charge (D) and the speed of rotation of the alternator is in a rotation speed range in which the progressive charge control means are activated.

6. An alternator for a motor vehicle comprising a stator, a rotor which is provided with an excitation coil, voltage regulation means which act on an excitation current which is supplied to the excitation coil in order to regulate an output voltage of the alternator, and means for controlling the progressive charge, characterized in that the progressive charge control means comprise means which can implement the method according to claim 1.

* * * * *